United States Patent [19]

Russell et al.

[11] Patent Number: 5,679,001
[45] Date of Patent: Oct. 21, 1997

[54] CHILDREN'S SPEECH TRAINING AID

[75] Inventors: Martin J. Russell; Robert W. Series, both of Worcestershire; Julie L. Wallace, Worcester, all of Great Britain

[73] Assignee: The Secretary of State for Defence in Her Britannic Majesty's Government of the United Kingdom of Great Britain and Northern Ireland, Whitehall, Great Britain

[21] Appl. No.: 256,215
[22] PCT Filed: Nov. 2, 1993
[86] PCT No.: PCT/GB93/02251
§ 371 Date: Jul. 6, 1994
§ 102(e) Date: Jul. 6, 1994
[87] PCT Pub. No.: WO94/10666
PCT Pub. Date: May 11, 1994

[30] Foreign Application Priority Data

Nov. 4, 1992 [GB] United Kingdom ............... 9223066

[51] Int. Cl.$^6$ .................................................. G09B 5/00
[52] U.S. Cl. ...................................... 434/185; 395/751
[58] Field of Search .......................... 395/2, 2.1, 2.16, 395/2.17, 2.52, 2.53, 2.55, 2.56, 2.6, 2.61, 2.62; 434/156, 185; 364/419.01

[56] References Cited

U.S. PATENT DOCUMENTS

| 3,345,979 | 10/1967 | Miura et al. | |
| 5,027,406 | 6/1991 | Roberts et al. | 395/2 |
| 5,202,952 | 4/1993 | Gillick et al. | 395/2 |
| 5,212,730 | 5/1993 | Wheatley et al. | 395/2.52 |
| 5,333,236 | 7/1994 | Bahl et al. | 395/2.65 |

FOREIGN PATENT DOCUMENTS

| 0 360 909 | 4/1990 | European Pat. Off. . |
| 0 504 927 | 9/1992 | European Pat. Off. . |
| 0 535 909 | 4/1993 | European Pat. Off. . |
| 0 540 328 | 5/1993 | European Pat. Off. . |
| 23 49 626 | 4/1975 | Germany . |
| 23 04 070 | 6/1981 | Germany . |
| 92/06468 | 4/1992 | WIPO . |

OTHER PUBLICATIONS

J.N. Holmes, "Speech Synthesis & Recognition," 1988, pp. 103–168.

*ICASSP-92 IEEE International Conference on Acoustics, Speech and Signal Processing,* 23 Mar. 1992, IEEE Signal Processing Society, San Francisco, vol. 2, Lorin P. Netsch et al., "Speaker Verification Using Temporal Decorrelation Post-Processing", pp. II-181 to II-184.

(List continued on next page.)

*Primary Examiner*—Richard J. Apley
*Assistant Examiner*—Glenn E. Richman
*Attorney, Agent, or Firm*—Nixon & Vanderhye P.C.

[57] ABSTRACT

A children's speech training aid compares a child's speech with models of speech, stored as sub-word acoustic models, and a general speech model to give an indication of whether or not the child has spoken correctly. An indication of how well the word has been pronounced may also be given. An adult operator enters the word to be tested into the training aid which then forms a model of that word from the stored sub-word speech models. The stored acoustic models are formed by first recording a plurality of words by a plurality of children from a given list of single words. These recordings are then processed off-line to give a basic acoustic model of an acceptable or correct sound for each phoneme in the context of the pre- and proceeding phonemes. The acoustic models are Hidden Markov Models. The limits of acceptable pronunciation applied to different words and children may be adjusted by variable penalty values applied in association with the general speech acoustic model. The training aid generates accumulated word costs for each child's utterance and uses these costs to indicate correctness of pronunciation.

17 Claims, 10 Drawing Sheets

OTHER PUBLICATIONS

J. Vandewalle et al., "Signal Processing VI Theories and Applications Proceedings of EUSIPCO–92," 24 Aug. 1992, Elsevier, Brussels, vol. 1, T. Kuhn et al., Context–Dependent Modelling in a Two–Stage HMM Word Recogniser for Continuous Speech, pp. 439–442.

Luis Torres, "Signal Processing V Theories and Applications Proceedings of EUSIPCO–90," 18 Sep. 1990, Elsevier, Barcelona, Spain, vol. 3, Alberto Ciaramella et al., A Recognizer for Large Vocabulary Applications, pp. 1503–1506.
*Radio Fernsehen Elektronik*, vol. 40, No. 6, 1991, Berlin DD, pp. 314–318, Rüdiger Hoffman, "Neue Wege Der Spracherkennung".

Fig. 3 (a) Variable Frame Rate (VFR) Analysis
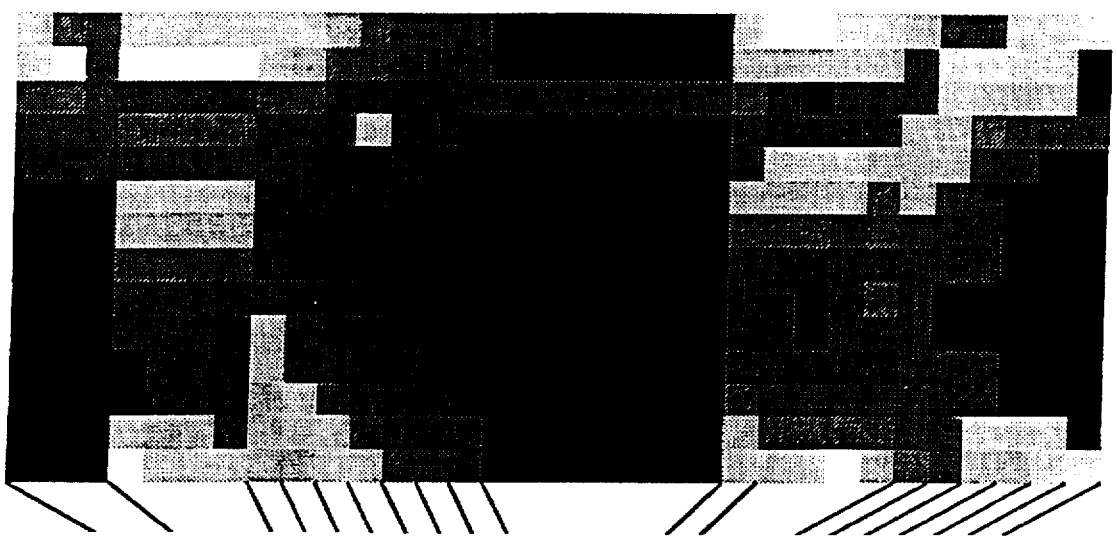
Fig. 3 (b)
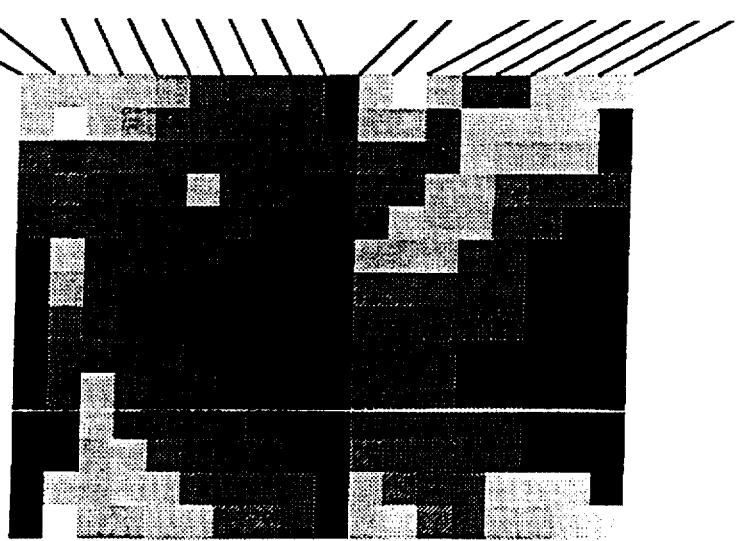
vfr channel 

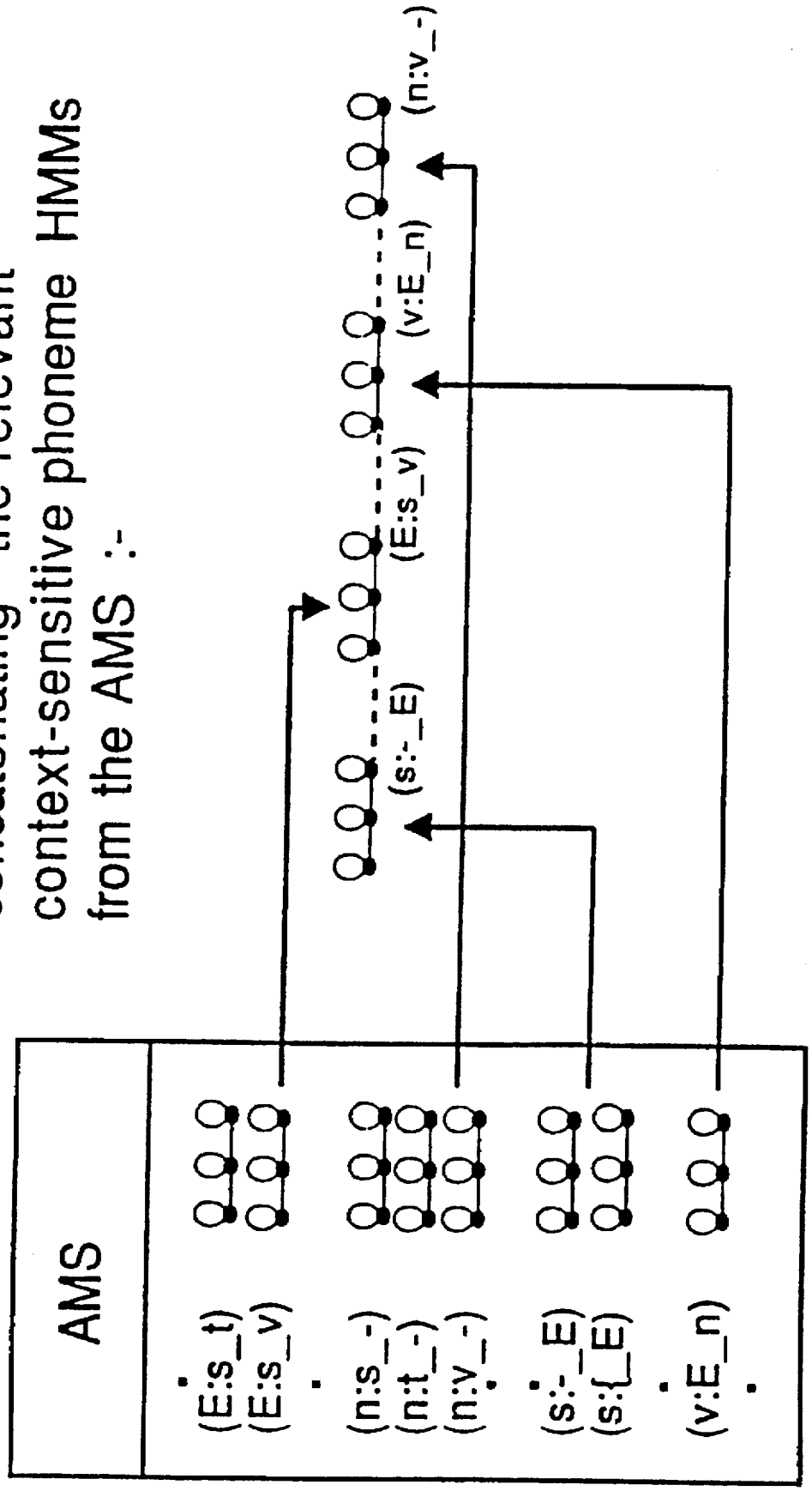
Fig.5 The word-level HMM is obtained by concatenating the relevant context-sensitive phoneme HMMs from the AMS :-

Syntax for Word Cost

Syntax for Cost Through General Speech Model

CHILDREN'S SPEECH TRAINING AID

This invention concerns a childrens speech training aid. Such an aid is useful in comparing a child's pronunciation with a desired value to give an indication of correct pronunciation. This indication may then be used by an operator, eg a teacher or therapist etc, to identify children in need of speech therapy or by a child to change pronunciation until acceptable.

BACKGROUND

There are a number of speech recognisers of differing complexity and accuracy. Most identify a single word out of a stored set of words, and if that word is identified, activate a further step, eg operate a switch. Many speech recognisers require extensive training by the operator and operate with a few set words. When asked to speak a single word many children make additional sounds such as uumm or er, and vary the time taken to speak. Additionally, in a classroom environment there are various non speech background noises, and possibly a teachers voice reading out words for a non reader. This makes speech recognition more difficult, because the non speech sounds themselves have to be recognised and dismissed as superfluous. Many available speech recognisers will give a match even when only part of a desired word is spoken. Thus for example the word "county" might be recognised as "cow", "count", or "tea", or correctly as "county".

Each word in a spoken language can be broken down into a set of about 40 phonemes, ie 40 different sounds, that can be use alone or combined together to pronounce each word. Some phonemes are context insensitive, others are context sensitive, ie they sound different according to the pre- and proceeding phonemes combinations. The convention adopted to describe these phonemes is described for example by J Wells et al, in a book chapter Specification of SAM phonetic alphabet (SEA), included in: P Winski, W J Barry &A Fourien (Ed), Support available from SAM project for other ESPRIT speech and language work, The SAM Project, Dept of Phonetics, University College, London.

The present invention is concerned with the correctness of a complete spoken word against a desired standard in the midst of non speech or noise sounds.

STATEMENT OF INVENTION

According to the present invention a child's speech training aid compares a child's speech with that speech as generated by stored acoustic models and general non speech sounds to give an indication of whether or not the child has spoken correctly.

According to this invention a child's speech training aid comprises an acoustic model store for storing acoustic models of context sensitive phonemes representing the processed results of speech by numerous children; a dictionary for storing a list of words together with information to construct acoustic models of these words from the acoustic model store; a network generator for generating an acoustic model of a required word together with an acoustic model of, general speech sounds; input means for requesting the generation of an acoustic model of the required word; means for receiving a child's utterances; means for processing the child's utterances into a form suitable for comparison with acoustic models of speech; a speech pattern matcher for comparing the processed child's utterances with the acoustic models of the required word and general speech; and means for indicating whether or not the child's utterances are the required word together with an indication of the accuracy of pronunciation of that required word. The training aid acoustic models may be Hidden Markov Models.

The child's utterances are sampled and processed into an N-plurality of channels to provide an N-dimensional feature vector in successive time slot periods forming a sequence of feature vectors.

The speech pattern matcher may compute the relative probabilities of the sequence of feature vectors being either the same as the acoustic word model or the acoustic general speech model.

The speech pattern matcher may operate continually so that the required word is recognised within continual speech.

The speech pattern matcher may compute the accumulated cost difference between the beginning and end of a recognised child-spoken word and use this difference to give an indication of the accuracy of a child-spoken word.

The training aid may further include a variable penalty control arranged to cooperate with the acoustic model of general speech in forming an adjustable standard for the indication of accuracy of a child spoken word. The value of penalty may be changed in accordance with set values associated with different required words. Additionally the penalty values may be varied by an adult operator to suit individual children.

The input means may include a keyboard for entering required words into the training aid for each testing session.

The speech training aid may include means for prompting a child to speak the required word, eg a speech synthesizer and loudspeaker and or a video monitor with screen for display of messages.

The speech training aid may include means for recording the results of a session of a child's speech, indicating words requested, words spoken correctly, and how correctly spoken.

The acoustic model may be a model of a single word or a series of sub-word models and together with general speech models, and the speech pattern matcher gives an indication of the correctness of utterance of separate parts of the required word.

The acoustic word model may include an additional acoustic model prior to the acoustic word model so that stuttering in a child's utterances may be separated from the word.

The stored acoustic models are preferably formed by recording a plurality of words by a plurality of children from a given list of single words. These recording are processed off-line to give a basic acoustic model of an acceptable or correct sound for each word or of each phoneme. Subsequent real time testing of children is done against these stored basic acoustic models and is speaker independent, ie the child being tested need not be a child who provided part of the original recordings.

In an example of classroom use a child wears a headset and microphone connected to the training aid. An operator enters a word or a series of words into the training aid via a computer terminal keyboard. This sets up acoustic models of the requested words. A child can then be prompted to speak a required word either by reading the word on a computer monitor screen, or on hearing instructions from a speech synthesizer loudspeaker. Alternatively an operator may read out words to be spoken by a child. All utterances made by the child pass into the training aid for comparison with the stored acoustic models of the requested word and the general speech acoustic model. If a word is spoken correctly the child's utterances will pass through the acoustic word model and be acknowledged to the child, eg via the monitor screen or aurally from the speech synthesizer. If the word is not spoken correctly the utterances will have passed through the general speech model and this is indicated to the child and operator.

BRIEF DESCRIPTION OF DRAWINGS

The invention will now be described, by way of example only, with reference to the accompanying drawings of which:

FIGS. 3a and 3b are schematic representations of signals within the front end analyser of FIG. 2 for the spoken word FIVE-NINE, FIG. 5 is a representation of the formation of a word-level Hidden Markov Model obtained from context sensitive phonemes held in an acoustic model store.

DESCRIPTION OF THE INVENTION WITH REFERENCE TO THE DRAWINGS

Figure 1:
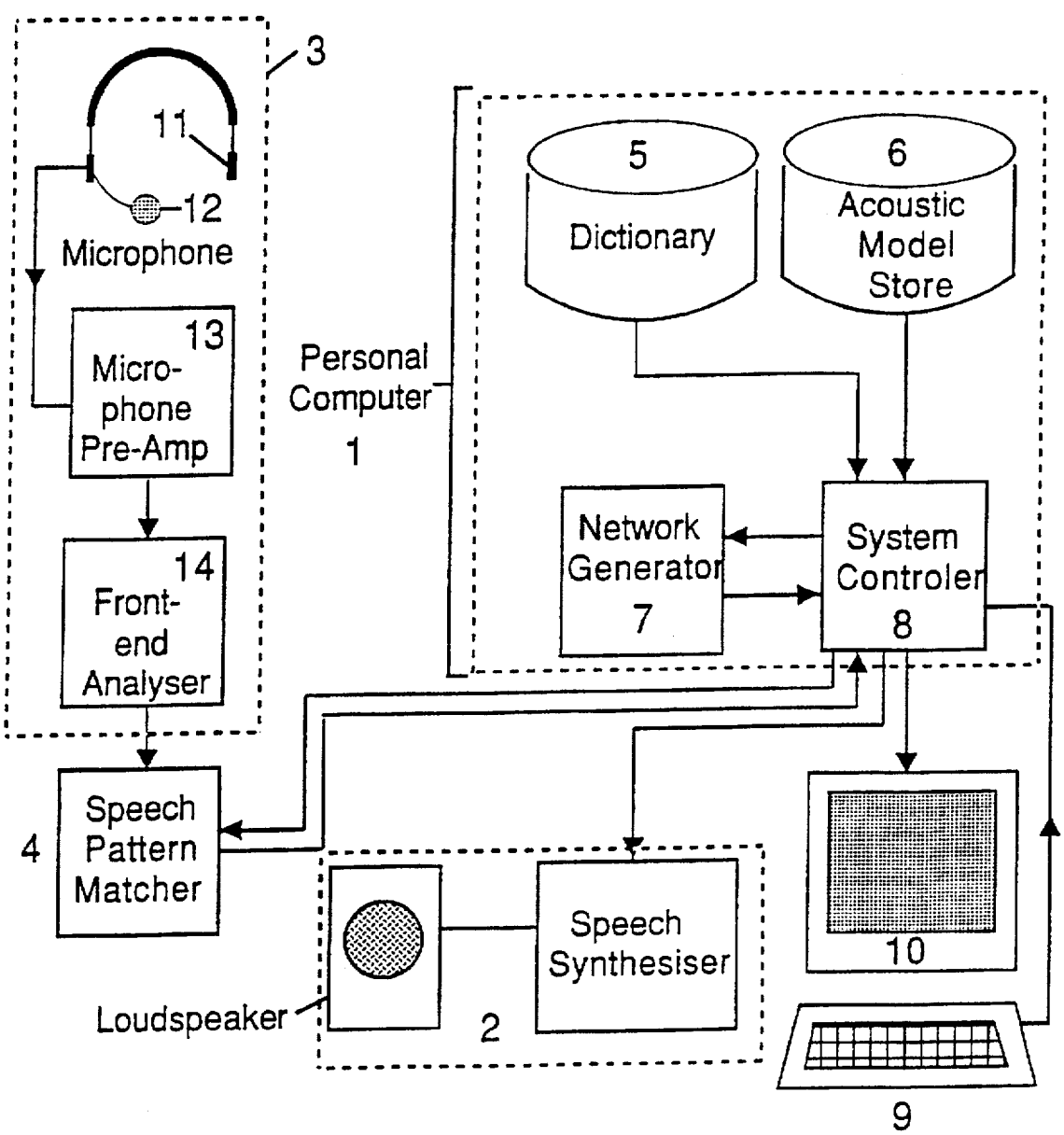
FIG. 1 is a block diagram of a speech training aid.

The speech training aid is shown in FIG. 1 to comprise a small computer and terminal 1, a speech synthesizer system 2, a speech input system 3, and a speech pattern marcher 4.

Within the computer 1 are a dictionary 5, an acoustic model store 6, a network generator 7, and a system controller 8 for controlling the complete system. A keyboard 9 and monitor 10 connect to the controller 8.

The speech input system 3 comprises a headset 11 and microphone 12 worn by a child being tested. The microphone 12 output is amplified by amplifier 13 and fed into a front-end analyser 14.

Figure 2:
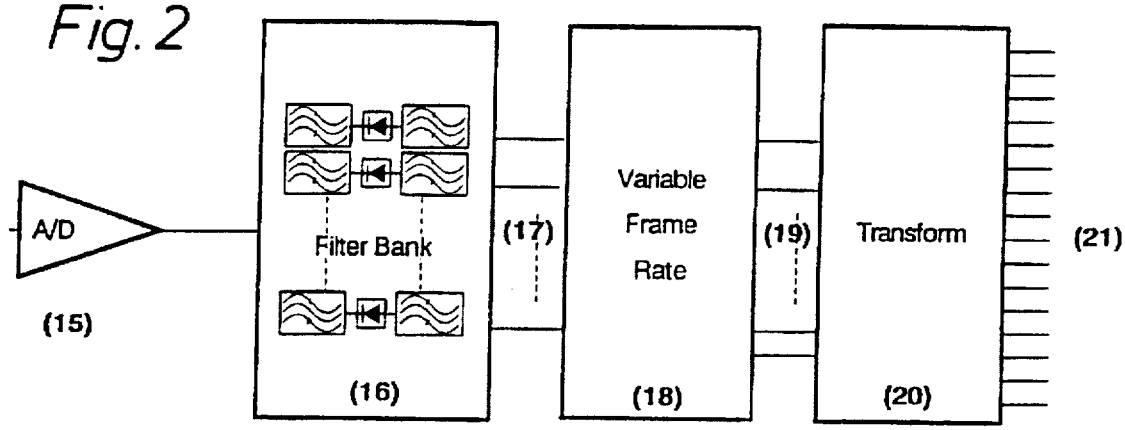
FIG. 2 is a block diagram of part of FIG. 1, a front end analyser.

This analyser 14, is shown in more detail in FIG. 2, and comprises a digital to analogue converter 15 which samples the input waveform Si at 20,000 Hz and directs its output into a filter bank 16 of N channels each receiving the digitized signal Si in parallel; typically N=27. Details of the filter characteristics are shown in Table 1 below.

TABLE 1

| Channel No | Centre Frequency Hz | Bandwidth Hz |
|---|---|---|
| 0 | 0 | 120 |
| 1 | 120 | 120 |
| 2 | 240 | 120 |
| 3 | 360 | 120 |
| 4 | 481 | 121 |
| 5 | 603 | 124 |
| 6 | 729 | 127 |
| 7 | 859 | 132 |
| 8 | 994 | 138 |
| 9 | 1136 | 146 |
| 10 | 1286 | 154 |
| 11 | 1445 | 164 |
| 12 | 1615 | 175 |
| 13 | 1796 | 187 |
| 14 | 1990 | 201 |
| 15 | 2198 | 215 |
| 16 | 2421 | 233 |
| 17 | 2670 | 267 |
| 18 | 2962 | 319 |
| 19 | 3315 | 390 |
| 20 | 3747 | 478 |
| 21 | 4277 | 584 |
| 22 | 4921 | 708 |
| 23 | 5700 | 851 |
| 24 | 6629 | 1011 |
| 25 | 7728 | 1190 |
| 26 | 9015 | 1387 |

In each N channel is a smoothing circuit for smoothing out the pulsed output from a child'as larynx, typically at a frequency of 300 to 500 Hz; which contrasts with that of 50 to 200 Hz for an adult. Each channel output is sampled at 100 times per second, ie each sample time is 10 ms. The collective output of the filter bank 16 is illustrated in FIG. 3 for the word FIVE-NINE. The horizontal axis represents time, the vertical axis each channel N (and hence different frequencies with lower frequencies at the bottom), and the darkness, ie grey scale, the intensity of sound. The output of each filter channel N is a "dimension" sampled every 10 ms. Thus for each 10 ms time slot the collective output of the filter bank 16 is a 27 dimensional vector, ie a matrix of numbers representing 27 different values over one time period. For ease of description FIG. 3 only shows 14 filter channels. As shown in FIG. 3 the plot shows distinctive areas each representing a phoneme in the word FIVE-NINE, represented phonetically by f.aI.v.n.aI.n.

Outputs 17 from the filter bank 16 pass through a variable frame rate circuit 18 which can be set to reduce the amount of information in each frame or word shown in FIG. 3. Variable frame rate (VFR) analysis is a method for data-rate reduction which has been shown to give improved performance over fixed frame rate analysis for automatic speech recognition (S M Peeling and K M Ponting, Variable frame rate analysis in the ARM continuous speech recognition system, Speech Communication 10, pp 155–162, 1991). In its simplest form VFR is used to remove vectors from an observation sequence.

A distance is computed between the current observed vector and the most recently retained vector, and the current vector is discarded if this distance falls below a threshold T. When a new observed vector causes the distance to exceed the threshold, the new vector is kept and becomes the most recently retained vector. VFR analysis replaces sequences of similar vectors with a single vector, and hence reduces the amount of computation required for recognition. It has also been shown the VFR analysis can improve recognition accuracy.

FIGS. 3a and 3b respectively show an original signal from the filter bank 16 before and after data reduction by VFR analysis. As shown in FIG. 3a there exists within the utterances periods when the signals are reasonable uniform. For such periods s signal can be produced indicating an instantaneous value (a cross sectional sample) plus the length such a value remains reasonably constant. Such a compression reduces the number of vectors needed to express information. In some cases use of frame rate compression reduces the accuracy and so the variable frame rate circuit is adjusted to zero, ie it appears transparent to passing signals. In FIG. 3b there is an additional line of information, below the 14 channels shown, representing the compression value for each feature vector in the compressed feature vector sequence.

Outputs from the variable frame rate circuit 19 are then transformed in a transform circuit 20, using a linear or non-linear transformation, to make them more consistent with the assumptions which are made in the models in the acoustic model store 6, or to enhance the differences between vectors which correspond to different speech sounds. An example of such a transformation is a delta-cepstral transformation.

Let $v_t = v_t^1, v_t^2, \ldots, v_t^{27}$ be the output from the filterback 16 at time t. The delta-cepstral transformation might consist of the following stages:

(i) Amplitude normalisation: the mean channel amplitude $$\bar{v}_t = \frac{1}{27} \sum_{i=1}^{27} v_t^i \quad (1)$$

is calculated, subtracted from each channel value $v_t^i$. This results in a 27 dimensional vector $w_t$, where $w_t^i = v_t^i - \bar{v}_t (i=1, \ldots, 27)$.

(ii) Cosine transformation: the vector $w_t$ is rotated using a cosine transform C to give a new 27 dimensional vector $x_t$; where $x_t = C w_t$.

(iii) Truncation: a 9-dimensional feature vector $X_t'$ is constructed from the bottom 8 components of $X_t$ and the amplitude term $v_t$.

(iv) Addition of Time-Differences: an 18 dimensional vector $Y_t$ is obtained by augmenting $X'_t$ with the difference between $X'_{t-1}$ and $X'_{t+1}$.

$$Y_t^i = X_t^{1, i} \quad i=1, \ldots, 9$$

$$Y_t^i = X_{t-1}^{1, i-9} - X_{t+1}^{1, i-9} \quad 10, \ldots, 18$$

Summary: The output of each filter channel is a "dimension" sampled every 10 ms. Thus for each 10 ms time slot the collective output of the filter bank 16 is a 27-dimensional vector. Output 21 of the transform circuit 20 is a serial sequence of transformed vectors termed feature vectors $Y_t$.

The order of VFR 18 and transform circuit 20 may be reversed. Also, during variable frame rate analysis the variable frame rate count (ie the number of vectors which a retained vector replaces) may be kept and added as an additional channel to the feature vector (shown at the bottom of FIG. 3b). This additional channel parameter may be ignored during the amplitude normalisation stage and treated in the same manner as the amplitude term during subsequent processing.

Dictionary

The dictionary 5 is a text file stored on a disk or a read only memory (ROM), within the PC 1. This dictionary 5 has two functions: it contains a list of texts of words which can be used with the system, and it contains phoneme sequences to construct acoustic models of these words from the acoustic models in the acoustic model store 6.

Table 2 shows some examples of words and associated phonemes.

TABLE 2

| Word | > | Phoneme |
|------|---|---------|
| on | > | Q n |
| one | > | w Q n |
| settle | > | s E t l |
| seven | > | s E v n |
| seventh | > | s E v n T |
| sever | > | s E v @ |
| several | > | s E v r l |

The information in the dictionary 5 is entered manually through the keyboard 9 on initial set-up or during use to enter new words as required. A limitation on new words is that context sensitive phonemes for these new words must already exist in the acoustic model store 6.

Acoustic Model Store—AMS

The acoustic model store (AMS) 6 is information held as a file on a disk or ROM in the PC 1. The AMS 6 contains sets of parameters which define the statistical acoustic models of the phonemes in terms of which the words in the dictionary 5 are transcribed. The AMS 6 contains context sensitive hidden Markov models (Ms), plus context insensitive HMMs, one or more silence models, and a set of non-speech (the eg umms and ahs etc) or noise models (background class noises etc). The information in the AMS 6 is obtained by recording the voices of many children and processing their speech as detailed below to obtain models of each phoneme.

Context Sensitivity

In order to achieve good speech recognition performance using phoneme level models it is necessary to account for the fact that the acoustic pattern corresponding to the production of a particular phoneme depends significantly on the sequences of phonemes which precede and succeed it. This is achieved by the use of context sensitive phoneme models. Hence rather than containing a single acoustic model for each phoneme the acoustic model store may contain a number of models for each phoneme, one for each important context. An example of a context sensitive phoneme-level unit is a triphone, in which it is assumed that the only important contextual influences on the production of a phoneme are due to the immediately preceding and succeeding phonemes. For example the phoneme "I" in the word "sIks", ("six") would be represented by the triphone (I:s k) corresponding to "I", preceded by "s", and followed by "k".

A limitation of the triphone approach is that it is "vocabulary dependent". A new word which is added to the dictionary may include a triphone context which did not occur in any of the words in the original vocabulary and for which there is no model in the acoustic model store. This problem may be overcome using a method based on Phoneme Decision Trees. For a description of this method see:- L R Bahl et al, Decision Trees for Phonological Rules in Continuous Speech, Proc ICASSP 1991, Toronto; and S Downey and M Russell, A Decision Tree Approach to Task Independent Speech Recognition, Proc Institute of Acoustics, Autumn Conf, Windermere, Nov 1992.

Each phoneme is associated with a binary decision tree. In principle the terminal nodes of this tree correspond to equivalence classes of contexts which have the same influence on the acoustic realisation of that phoneme, and a context-sensitive model is constructed for each of these terminal modes and stored in the acoustic model store. Associated with each non-terminal node of the decision tree is a question and a pair of successor nodes. The two successor nodes correspond to positive and negative answers to the question. A question consists of "a set of phonemes" plus "a position", and is interpreted as "is the phoneme in this position relative to the current phoneme one of this set of phonemes?". Thus the question "{p, t, k}, −1", is interpreted as "is the phoneme immediately to the left of the current phoneme one of p, t, of k?". The process of assigning a phoneme in a given context to a terminal node of the corresponding tree (and hence to a phoneme-level Hidden Markov Model (HMM) defined below), starts with the application of the question at the root node of the decision tree corresponding to that phoneme. The process then moves to one of the two successor nodes, according to whether the answer to the question is positive or negative. If this new node is a terminal node then the phoneme in context has been associated with a model and the process terminates, otherwise the question associated with the new node is applied and the process continues.

Hidden Markov Models and the Baum-Welch Algorithm

An acoustic model, called a hidden Markov model (HMM), is constructed for each phoneme-in-context and stored in the acoustic model store. A HMM M is a statistical model. It consists of a sequence of N states, which can be thought of as corresponding to the sequence of sounds which make up the corresponding phoneme-in-context. The sequential structure (i.e. the order in which the states occur) and duration structure (i.e. the lengths of time that the states are occupied) are determined by a state transition probability matrix:

$A = [a_{ij}]_{i,j=1 \ldots N}$ where $a_{ij}$ is the probability of being in state j at time t given state i at time t−1.

The matrix A defines an N state Markov process. In order to relate the states to the sequence of acoustic feature vectors, each state i is associated with a probability density function $b_i$. The quantity $b_i(y_t)$ is the probability that the acoustic vector $y_t$ corresponds to state i. Typically $b_i$ is a multivariate normal distribution, defined on the space of acoustic vectors, which is parameterised by a mean vector and covariance matrix.

Given a sequence of acoustic vectors $Y = y_1, \ldots, y_t \ldots y_T$, and a sequence of states $x = x_1, \ldots, x_t, \ldots, x_T$ ($x_t = i$ for some $i = 1, \ldots N$), the joint probability of Y and x given M is given by:

$$P(Y, x | M) = b_{x_1}(Y_1) \prod_{t=2}^{T} a_{x_{t-1}, x_t} b_{x_t}(Y_t) \quad (4)$$

and the probability $P(Y|M)$ of y given M is:

$$P(Y|M) = \sum_x P(Y, x | M) \quad (5)$$

Alternatively one might be interested in the state sequence x which is most likely to have generated y $$\hat{P}(Y|M) = \max_x P(Y, x | M) \quad (6)$$

$$\hat{x} = \arg\max_x P(Y, x | M) \quad (7)$$

During recognition, the goal is to solve (3) and during training the goal is to maximise (2).

The goal of training is to find a HMM M which maximiaea (2). This problem is solved locally using the Baun-Welch algorithm [4].

Given a HMM M and a sequence of acoustic feature vectors y which corresponds to an utterance of the speech sound which one wishes to represent by M, the Baum-Welch algorithm specifies a procedure for defining a new HMM $\overline{M}$ with the property that $P(y|\overline{M}) \geq P(y|M)$. The basic algorithm has been extended to apply to several training sequences, and to train a set of HMMs using training sequences which correspond to sequences of the sounds which correspond to these HMMs with no explicit knowledge of where the component utterances begin and end in the training sequences (this is called embedded training). Given a set of training sequences Y typical procedure for training a set of HMMs is therefore as follows:

Initialisation

An initial estimate is obtained for a set of HMMs $M_0$, one for each phoneme (these are called monophone HMMs). This can be achieved in a number of ways. For example one can seek to identify all of the subsequences of acoustic vectors which correspond to a given model, uniformly partition each subsequence into N equal segments, and use the vectors in the ith segment in each subsequence to estimate the Parameters of the ith state of the corresponding initial model.

Monophone Reestimation

The Baum-Welch algorithm is applied to the set of initial models and the training sequences to produce a new set of models $M_1$ such that $P(Y|M_1) > P(Y|M_o)$. $M_1$ now becomes the set of initial models and the Baum-Welch algorithm is applied again to produce another set of models $M_2$ such that $P(Y|M_2) > P(Y|M_1)$. This procedure is repeated until the difference between $P(Y|M_I)$ and $P(Y|M_{I-1})$ falls below some threshold.

Initialisation of Context Sensitive Models:

The monophone HMMs $M_1$ are used to provide initial estimates for a set of context sensitive HMMs: each context sensitive model for a given phoneme is seeded with the parameters of the monophone HMM for that phoneme.

Context-Sensitive Model Reestimation

The Baum-Welch algorithm is again applied repeatedly, starting with the initial estimates of the context sensitive phoneme models, to produce a set of context sensitive phoneme level models M such that P(Y|M) is a local optimum. The set M is used in the acoustic model store.

In case there is a shortage of training material it may be useful to incorporate papameter sharing into the reestimation process. For example each state of each acoustic model can shape a common "grand" covariance matrix.

Network Generator

Figure 4:
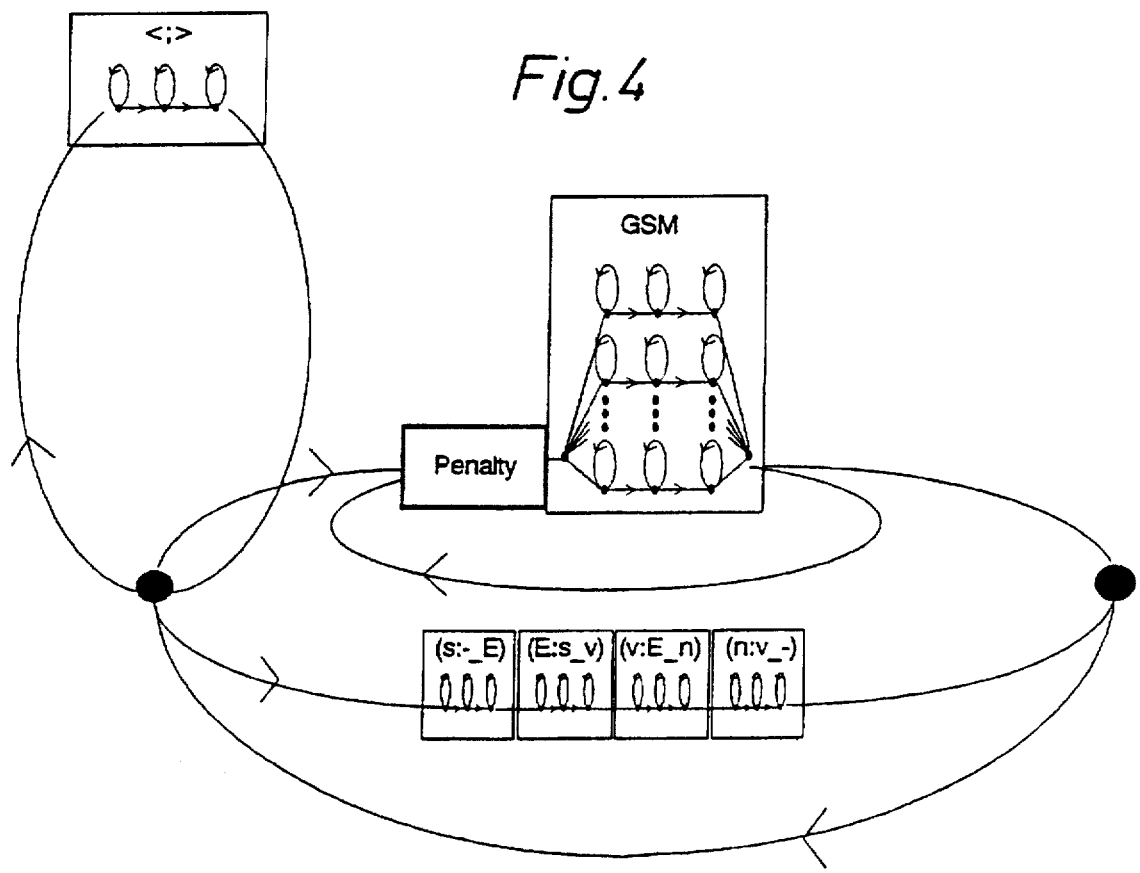
FIG. 4 is a representation of Hidden Markov Models acoustic models of a word to be recognised together with a general speech model.

The network generator 7 combines the relevant data from the dictionary 5 and AMS 6 into a data structure, shown in FIG. 4, which is suitable for processing by the speech pattern marcher 4. For a given word from the dictionary 5, this data structure can be split into two parallel halves. The first specifies the sequence of sub-word models which make up an acoustic model of the word. This is termed the word-model of the network. The purpose of the word-model is to match against speech patterns which correspond to acceptable pronunciations of the word. The second component consists of a complete set of about 50 context-insensitive monophone HMMs plus silence and non-speech HMMs, all in parallel. This is termed the general-speech component of the network. The purpose of the general-speech model is to match against speech patterns which correspond to any utterance which is not an acceptable pronunciation of the word.

The general speech model forms a separate HMM from all or some of the monophones in Table 3.

TABLE 3

| Phoneme | Example | Phoneme | Example |
| --- | --- | --- | --- |
| i | heed | aI | hide |
| I | hid | eI | hay |
| E | hear | oI | boy |
| { | had | au | how |
| A | hard | @U | hoe |
| Q | hod | I@ | here |
| O | hoard | e@ | there |
| U | hood | | |
| u | who'd | s | sell |
| 3 | heard | z | zoo |
| V | bud | S | shop |
| @ | about | Z | pleasure |
| | | f | foot |
| b | big | v | vice |
| d | dig | T | thin |
| g | good | D | that |
| p | port | h | help |
| t | take | w | win |
| k | cake | j | young |
| m | mat | | |
| n | need | <?> | Short noise |
| N | sing | <??> | Long noise |
| l | light | <;> | Background noise |
| r | right | <JW> | Teachers model |
| tS | church | £ | Silence |
| dZ | judge | | |

FIG. 5 shows the process of defining the word-model for the word SEVEN. Each phoneme is commonly shown to have a three state HNM although in practice it may have more. The phoneme sequence as stored in the dictionary and as shown in Table 1 above, is s,E,v,n. Therefore for example the triphone sequence for SEVEN is:

(s:-_E), (E:s_v), (v:E_n). (n:v_-)

The word level HMM (for SEVEN) is obtained by concatenating the relevant four triphone HMMs from the AMS as shown. Also shown, as examples, are non selected triphones for the phonemes E, n, and s.

The general-speech model is formed from all or some the monophones listed in Table 3 plus the silence HMM £, and non-speech HMMs <;>, <?>, <??>, etc in parallel as shown in FIG. 4. The general-speech model may be the same for all words. Therefore this part of the network could be stored permanently so that only the word-model would need to be constructed for each new word. Again, the Figure is only diagrammatic in the number of states in each HMM.

FIG. 4 illustrates the complete network for the case of the word SEVEN. The larger and more elaborate the general-speech model the more accurate the final result. The reason for this, is that a child's speech is matched to the complete network shown in FIG. 4, rather than a match to a single word or a plurality of words in a short list.

Speech Pattern Matcher

The function of the speech pattern matcher SPM 4 is to take a child's utterance and compare it with a model eg that of FIG. 4. The SPM 4 calculates which element of the model is most likely to be the same as the child's utterance. This will then identify if the spoken word is that word set up in the model or the general speech model. Additionally, the SPM 4 indicates a measure of how close the child's utterance is to a desired standard. This contrasts with systems which give a figure of merit to the matching (correlation) of a spoken word with a stored model; these can be misled by the correct pronunciation of only part of a required word.

Before describing the matching of a child's utterance to the word "seven", reference will be made to principles involved in speech recognition of more simple tasks.

Figure 6:
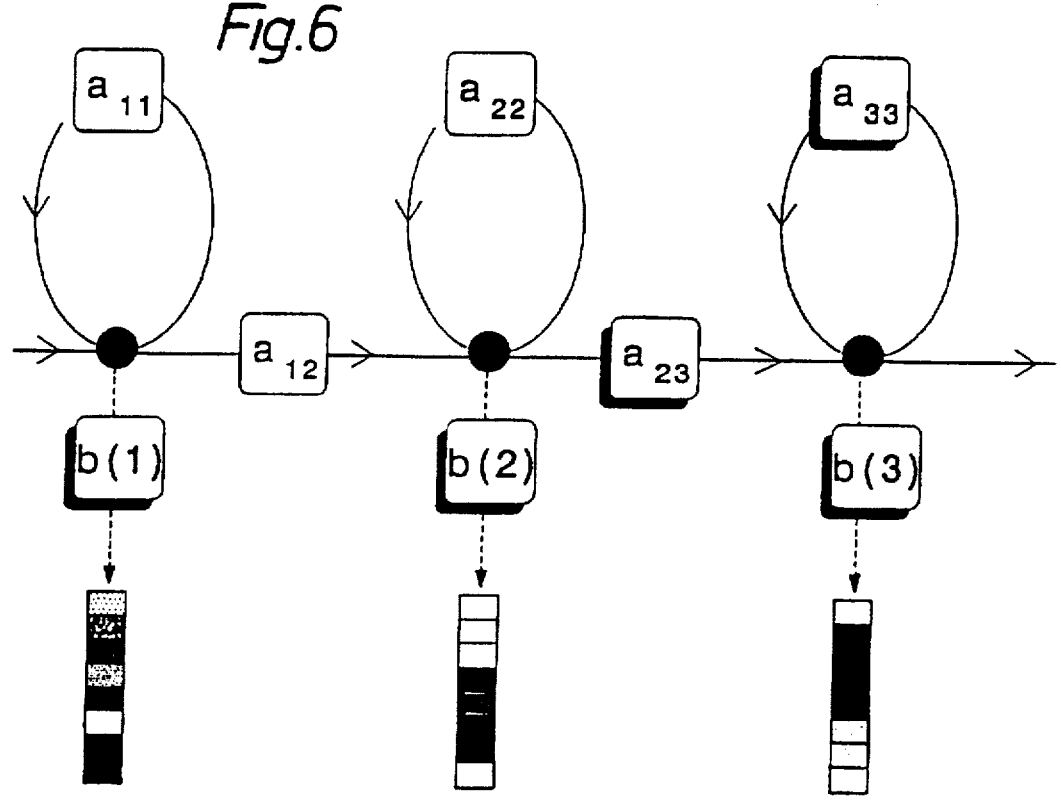
FIG. 6 is a schematic representation of a three state Hidden Markov Model.

FIG. 6 shows a schematic representation of a 3 state HMM. Although during recognition the problem is to compute which of the possible HMM models has the highest probability of being the same as the observed sequence of feature vectors (the child's speech), the model is most easily explained in terms of a process which gives rise to some sequence of vectors. In FIG. 6 the three solid circles represent the three states. At any instant in time the model is said to be in one of the three states. As time advances the model may make a transition from one state to another. The possible transition between states are shown by thin solid lines with an arrow indicating permissible transitions.

For the model shown in FIG. 6 transitions are only permitted from state 1 to 2, from 2 to 3, and from each state back to itself. In this example, the model cannot change from state 1 to state 3 without going through state 2. Each transition is associated with a number which represent the probability of the associated transition. Thus the number $a_{ij}$ represents the probability of a transition from state i to state j.

As the model makes a transition a feature vector is generated. The feature vector may be observed. The parameters which govern the generation of the feature vectors are associated with each state. In the present implementation generation of the feature vector is assumed to follow some multidimensional Gaussian distribution characterised by b(i) which contains the mean and covariance matrix of the feature vector probability density function. Gaussian distributions are not the only possible distribution. One common implementation strategy is to quantize the observed feature vectors and use parameters for $b_i$ appropriate to discrete distributions. Many other variants are possible.

The above describes how a HMM may be viewed as a stochastic (ie random—having an element of chance) model which gives rise to some sequence of observable feature vectors. During speech recognition is necessary to compute the relative probability of the model and the observed sequence being the same. Rather than deal directly in probabilities it is normal practice to work with numbers related to the logarithm of the probability. These numbers are referred to as "costs". A cost is associated with any feature vector/state combination and relates to the probability that the state gave rise to the feature vector (the 20 numbers in each 10 ms time slot). This cost can be termed the local cost. A cost may also be associated with a sequence of feature vectors and states. In this instance the cost relates to the probability that the sequence of feature vectors was generated by the given state sequence. This cost can be termed an accumulated cost. The function of a recognition algorithm is to find what sequence of states gives rise to the least accumulated cost for the observed sequence of feature vectors (eg. shown in FIG. 3b). This sequence is commonly known as the best path. The recognition algorithm is based on the Viterbi algorithm.

Figure 7:
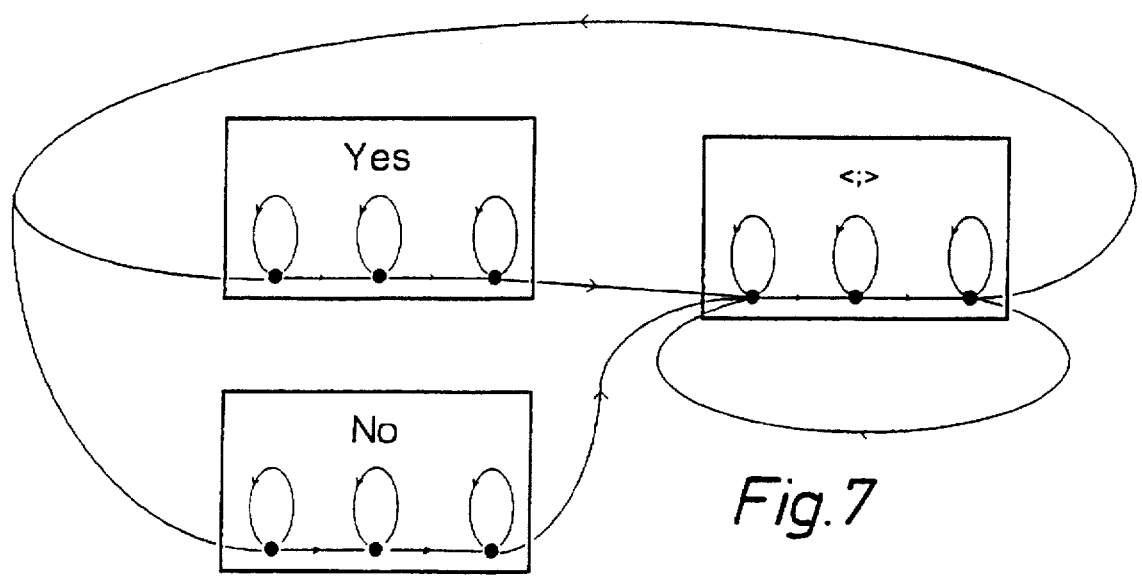
FIG. 7 is a syntax diagram of a simple acoustic model using Hidden Markov Models to recognise the words "yes", or "no"

An example of the working of the Viterbi algorithm will be given with reference to FIG. 7. This FIG. 7 shows an example of syntax diagram for a simple HMM based training aid arranged to recognise three models of the words "yes", "no", and a model for the background sound, ie silence, "<;>". The models may be constructed by concatenating a sequence of sub-word units, or alternately may be whole word models. For simplicity each word model is shown as containing only three states although in practice more states would normally be used. The syntax diagram show that the training aid may model any sequence of the words "yes" or "no" provided they are separated by one or more silences "<;>".

Figure 8:
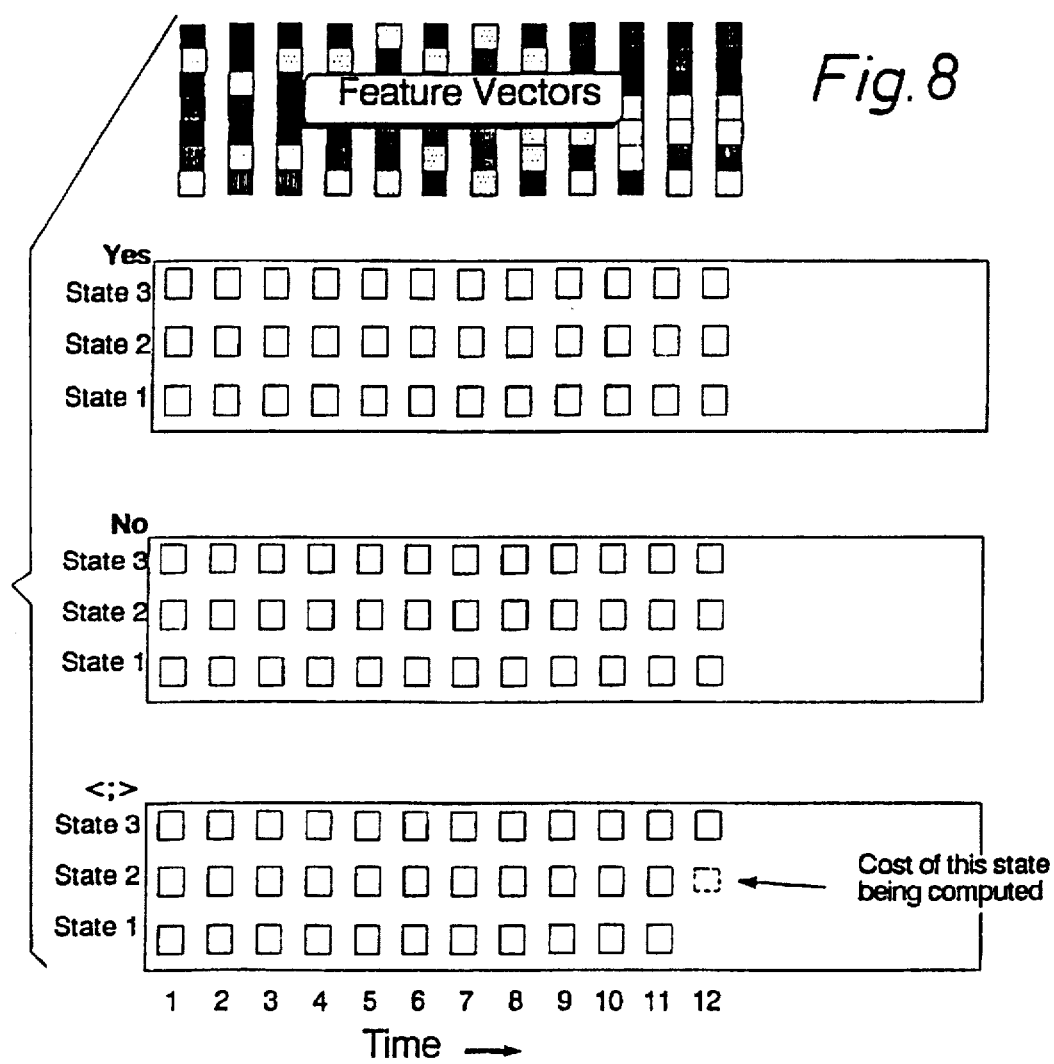
FIG. 8 is a representation of local cost computation for the model of FIG. 7.

FIG. 8 shows a representation of the tables of local costs for each state 1 to 3 in each model "yes", "no", and "<;>"; the value of each local cost is represented by an empty square. The most recent calculation is on the right hand side. Above the tables are representations of the feature vectors sequence (similar to that shown in FIG. 3). As each feature vector $Y_i$ (representing measured speech in each 10 ms time slot) is received the local cost $c_{ijk}$ for the feature vector is computed for each of the three states in each of the three models "yes", "no", and "<;>"; $c_{ijk}$ is the cost for the feature vector received at a time frame i for state k of model j. This may be expressed mathematically as:

$$c_{ijk} = \sum_l \left( \frac{y_i - \mu_{jkl}}{\sigma_{jkl}} \right)^2 b_{jk} \quad (2)$$

where $\mu_{jkl}$ and $\sigma_{jkl}$ are the mean and standard deviation of the Gaussian distribution associated with component l of state k of model j and $b_{jk}$ is a normalising constant. Put another way, the local cost for each state of each model is calculated from the observed feature vector values together with values taken from the model.

Each local cost, a number indicated by an open square in FIG. 8, is stored temporarily for further processing. Since the local cost values are related to the probability that a given state in the model gave rise to an observed feature vector, the pattern of numbers in the local cost table represents the probability that each state of each model gave rise to the observed feature vectors without regard to the permitted transitions between the states of the models or the application syntax.

Figure 9:
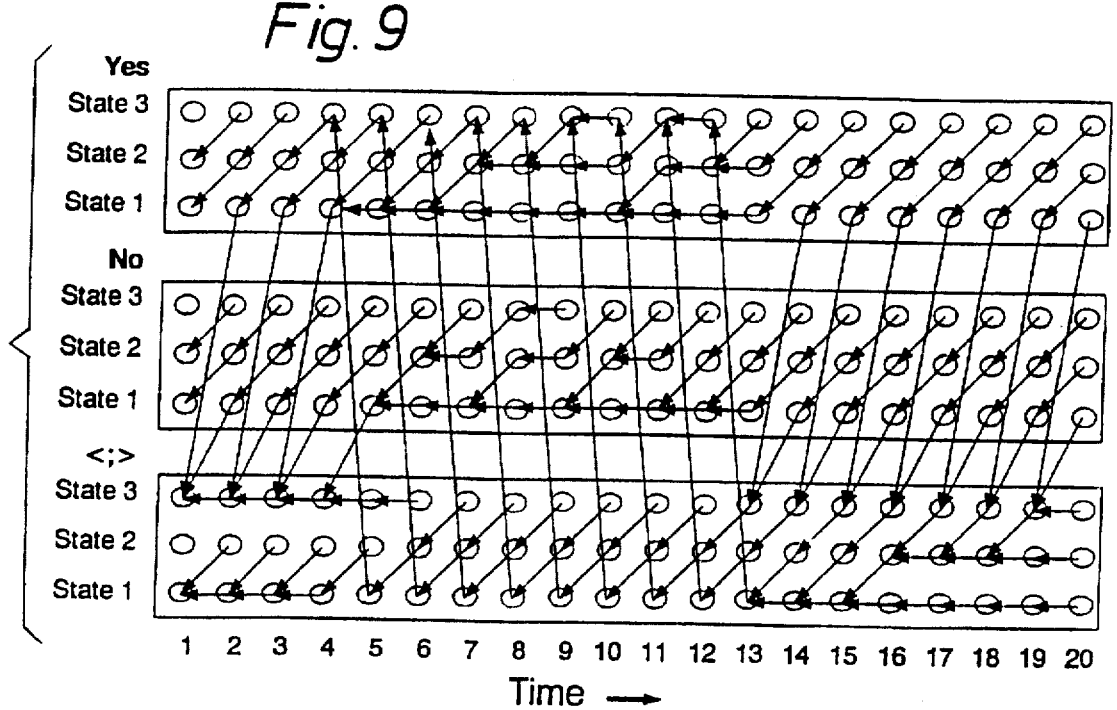
FIG. 9 is a representation of accumulated cost and path table for the model of FIG. 7, FIGS. 10a, 10b are representations of accumulated cost and path tables during and after processing of the model of FIG. 7.

The next stage of the computation is to incorporate the effects of the connectivity between the states, the transition probabilities and the application syntax. This phase of the computation is illustrated in FIG. 9 which shows accumulated costs and paths for the three models "yes", "no", and "<;>"; for each state an open circle represents an accumulated cost value (a number), and a line with arrow between states represents the most probable transition and its origin. Examination of FIG. 7 shows that only some transitions are allowed. For example state 2 of model-yes can only receive a transition from state 2 or from state 1 in a previous time slot. Similarly state 1 of model-<;> can only receive a transition from state 1 (of model-<;>), from state 3 of model-yes, or state 3 of model-no.

As each new feature vector is received (transformed speech signal in each 10 ms), two values are computed; (i) accumulated cost (a number) for the best (the most probable) sequence of states from some start point to the current time frame which finishes at the given state, and (ii) the most likely path taken by transitions (a line with arrow) from a given state from to the immediately previous state. The algorithm for these computations, the Viterbi algorithm, is carried out as follows:

To reach state k of model j at time frame i the system must have been in one of a limited number of states at time frame i–1 as determined by the application syntax and permitted transitions of the word or sub-word models, eg as shown in FIG. 7. The accumulated cost for the best path to the state at time frame i may be found by considering which of the paths from the possible precursor states at time i–1 to the state under consideration at time i gives the least accumulated cost. The accumulated cost is given as the sum of the accumulated cost at time frame i–1 to reach the precursor state $C_{i-1,j'k'}$, plus the logarithm of the transition probability from state k of model j which is a part of the model, plus the local cost $c_{ijk}$ as previously computed. Expressed mathematically the computation may be written:

$$C_{ijk} = \min_{j'}(C_{i-1,j'k'} + P_{jkl}) + c_{ijk} \quad (3)$$

The value $C_{ijk}$ of accumulated cost (a number) is calculated for each state 1, 2, 3 of each word model, and placed in the table of FIG. 9 as represented by the open circles. Each calculation $C_{i-1,j'k'}$ is the accumulated cost at a particular state which takes account of previous accumulated costs. The values $P_{jkl}$ represent 'penalties' in the word model, ie weighting or biasing of transitions. The value $c_{ijk}$ is local cost, obtained and described in FIG. 8. To avoid overflow the numbers are normalised during computation.

As more feature vectors are processed and the tables updated, the accumulated cost values and their associated paths form a record of the most probable sequence of states which are consistent with the observed sequence of feature vectors. Examination of FIG. 9 shows the most probable path taken by an observed sequence of feature vectors (transformed speech signals) through the arrangement of models in FIG. 7. The question to be asked is did the observed speech pass from silence through the model-yes or the model-no; if the observed speech passed through the yes model, then it is more certain that the uttered word was "yes" than "no".

Figure 10:
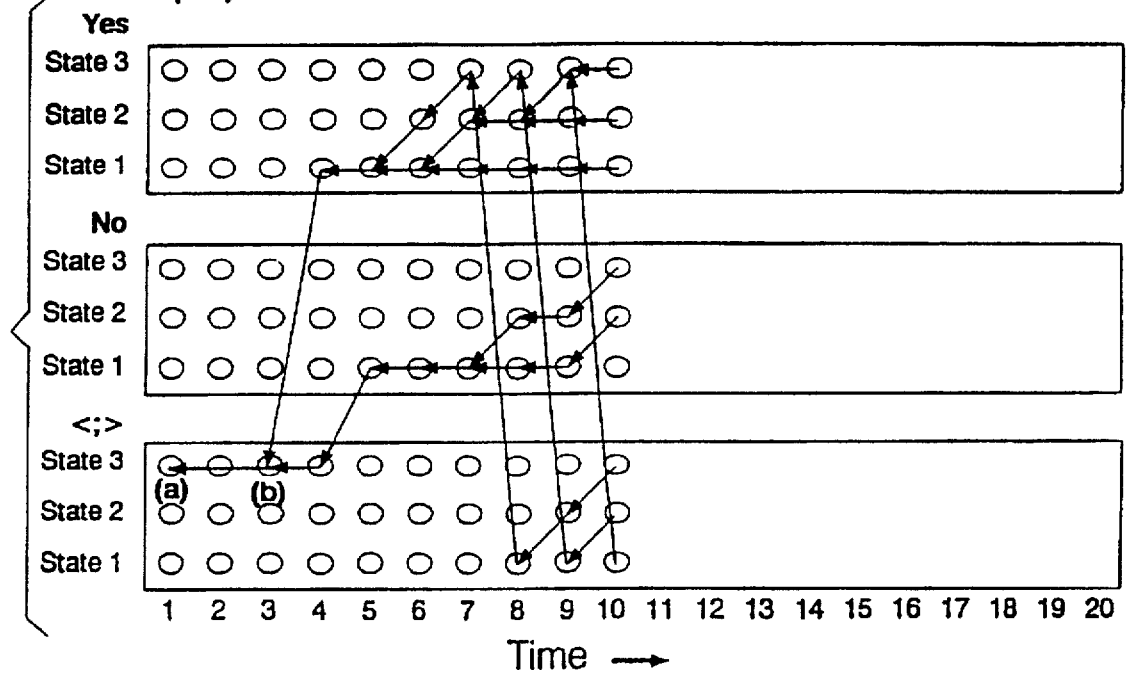
Figure 10:
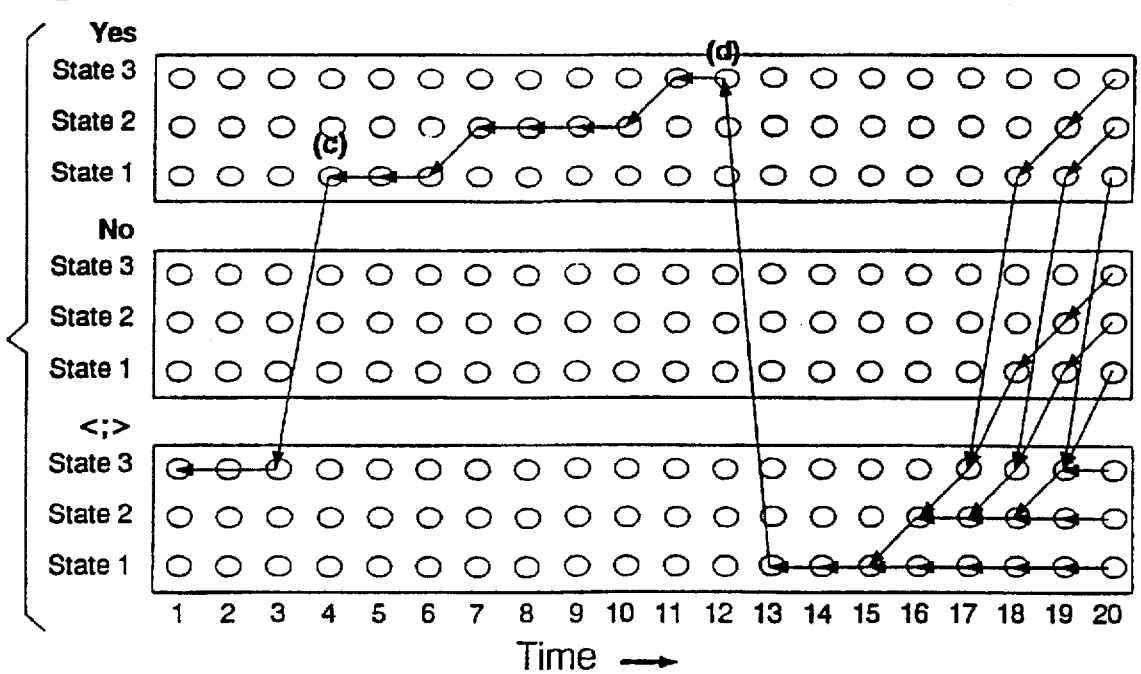

To answer this question it is normal to employ processing known as partial traceback. This is illustrated in FIGS. 10a,b which are similar to FIG. 9 but processed about halfway through the uttered word, FIG. 10a, and sometime later, FIG. 10b. During partial traceback all paths terminating at the current time slot (that column of open circles at the right-hand end) are examined. Low values of cost represent high probability of an event happening; high cost values represent highly improbable events and can be ignored in some cases.

Each path represents a possible state sequence going back in time and the associated accumulated cost represents the probability that the path gave rise to the observed feature vectors.

FIG. 10a represents the situation while a traceback is being carried out during an utterance. As the paths are traced back from right to left on the FIG. 10a they converge. It can be proved that once two paths have converged they never diverge again in traceback. Between the first and second time slots, the two columns on the left hand side, all paths have converged to a single path marked (a), and (b). This region is called the resolved region. Between time frames slots 3 and 10 there is a plurality of possible paths. Although the path with the least accumulated cost at time frame 10 represents the most probable sequence of states to explain the data to time frame 10, it is possible that as more feature vectors are processed this will no longer remain the best path.

In FIG. 10a no values have been listed, instead all values are represented by open circles, thus inspection without knowledge of the numbers computed does not indicate the most probable path to time frame 10. Thus as more feature vectors are processed the best path seen at time frame 10 in FIG. 10a may change. This might occur during the utterance of a word such as 'asked' with word models for the words 'asked' and 'ask'. If traceback is performed before the word is completed it is likely that the accumulated costs for states in the models for the words 'ask' and 'asked' will be similar. Only when the utterance is complete will there be substantial differences in the accumulated costs.

In FIG. 10a it is seen that for time frames prior to frame 7 all possible paths have converged to a single path. Since the algorithm never changes the path history for previous time frames the part of the path between points (a) and (b) will never change and may be reliably reported. In this example the silence model was the most probable state sequence for the feature vectors between time frames 1 and 2.

FIG. 10b shows the traceback process sometime later. Now the resolved region passes through the model for the word 'yes', none of the paths which previously passed through the model for the word 'no' are reachable from the current time frame frame 20. Thus the start of the uttered word has been detected at (c) in time frame 4; the end of the word has been detected at (d) in time frame 12; and the uttered word has been found to be 'yes'.

Unfortunately this by itself does not give any indicated of the correctness of pronunciation. Therefore the speech training aid must contain additional processing if it is to be used as an aid to recognition of speech impediments or poor pronunciation. Furthermore it is desirable to able to vary the standard of or border between acceptable and unacceptable speech. For example a poor speaker may need a more relaxed standard initially, with increasingly strict standards applied later. Thus standards need to be variable, under the control of an adult operator.

One of the values found during the above computations is the accumulated cost $C_w$ associated with the time frames for which the path was in the word model 'yes'. The value of $C_w$ is termed the cost of the word model; ie the the accumulated cost at the end (d) of the word less the accumulated cost on entry to (c) of the word. Since the values of $C_w$ may be related to the probability that the model gave rise to the observed sequence of feature vectors it is possible that the value of $C_w$ may be used as an indication of how close the utterance fits the model.

Figure 11:
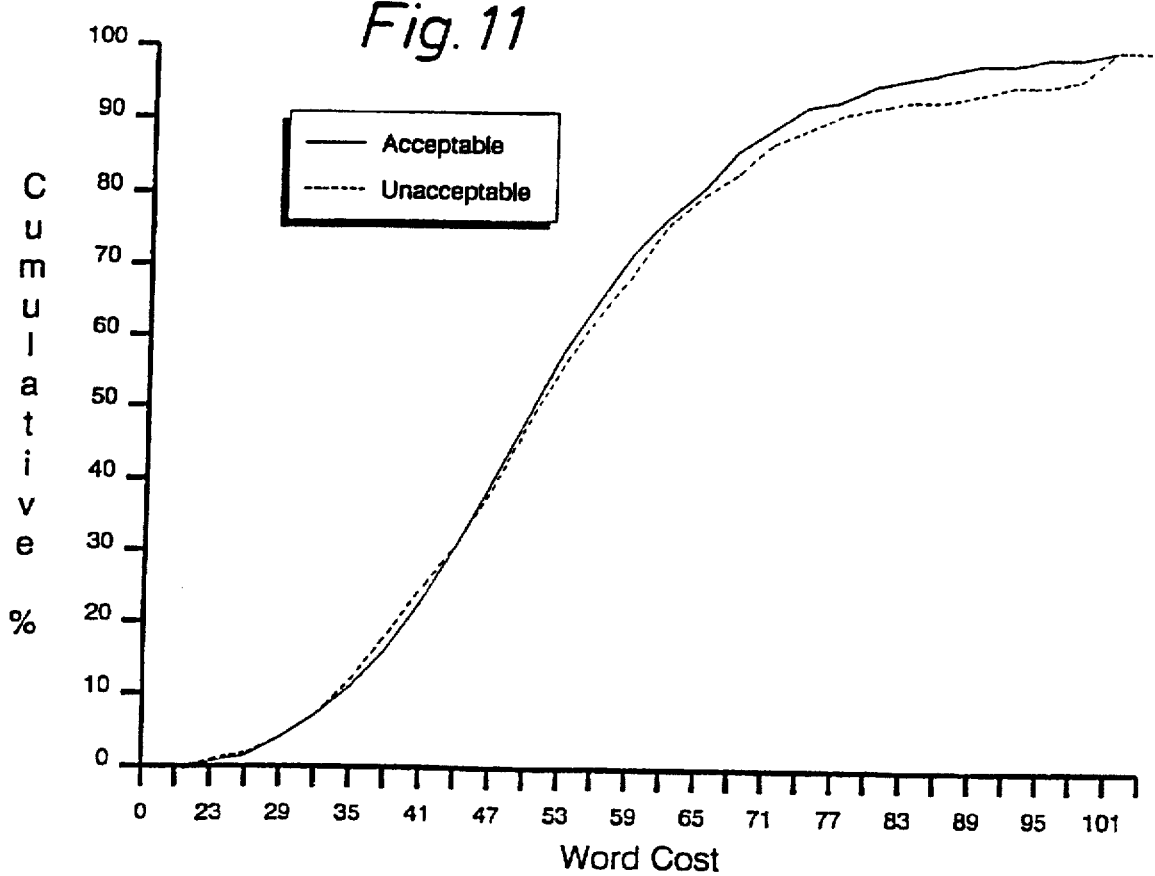
FIG. 11 is a cumulative histogram of cumulative word cost values for spoken words judged to be acceptably and unacceptably pronounced as judged aurally by an operator.

FIG. 11 as a cumulative frequency histogram against accumulated word cost in which the broken curve shows the data for acceptable words and the solid curve shows the data for unacceptable words; the decision on acceptable or unacceptable was made by an adult operator from the recording.

Unfortunately, there is little difference between correct and unacceptable pronunciation as found by comparing individual accumulated word cost values $C_w$ against correctly spoken mean word cost values.

One reason for the insensitivity of accumulated word cost values $C_w$ may lie in the differing vocal apparatus between different children. Thus it may be useful to make some measurement of each child's vocal apparatus, and use this as a baseline in measuring word cost values $C_w$.

Figure 12:
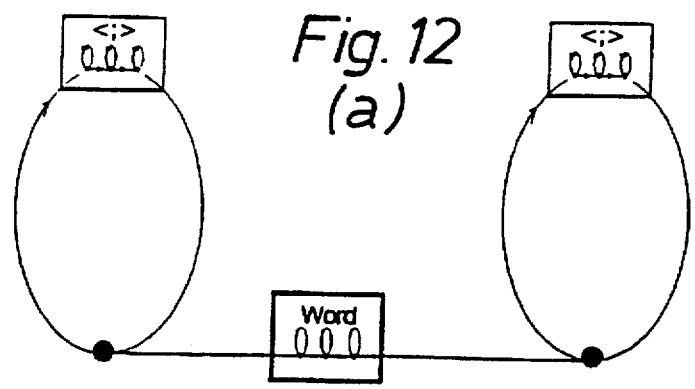
FIGS. 12a, 12b are representations of models arranged for comparing accumulated word costs of utterances passing through a word model and a general speech model respectively.
Figure 12:
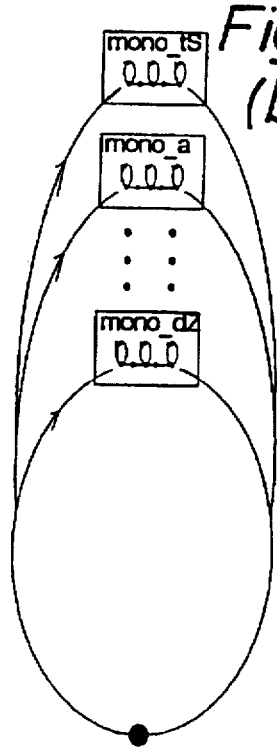

Recorded data taken in developing FIG. 11 was processed as follows. A HMM as shown in FIG. 12a was constructed; this contains only a silence HMM either side of a word HMM. A series of recorded words were processed and for each word the mean value of $C_w$ was computed.

Figure 13:
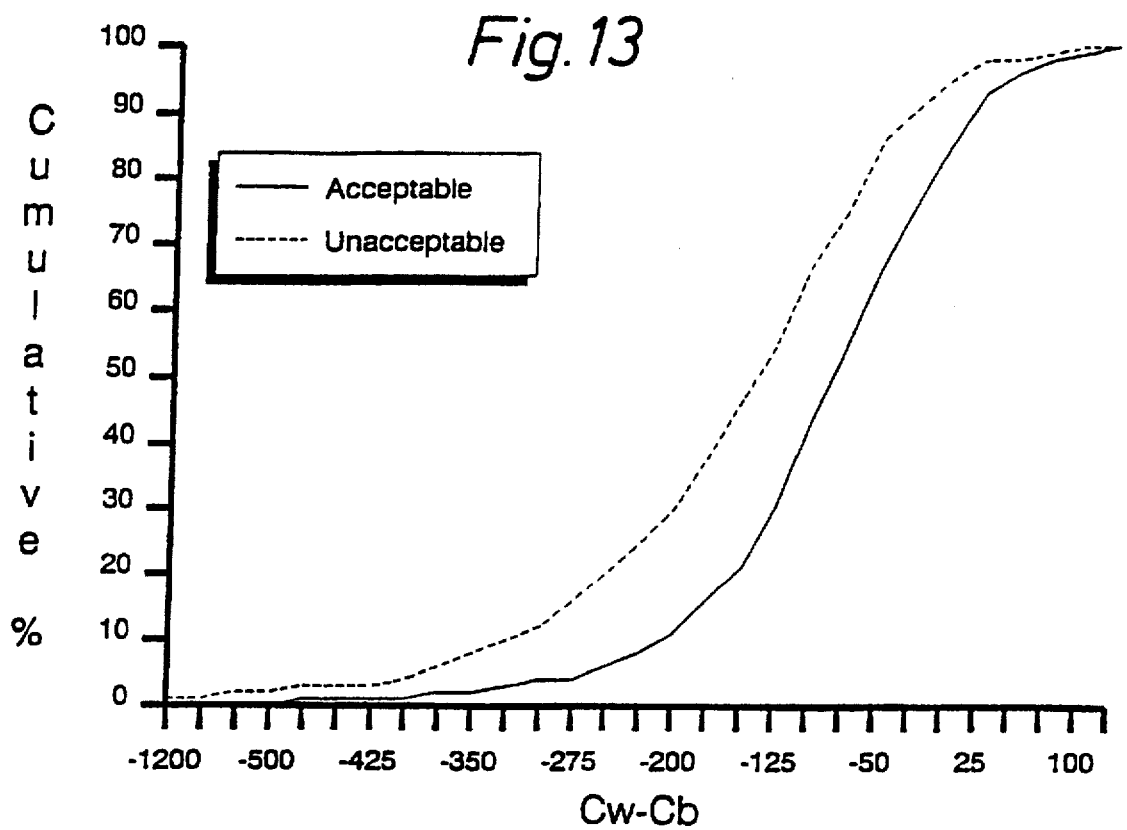
FIG. 13 is a cumulative histogram of cumulative word cost differences for spoken words judged to be acceptably and unacceptably pronounced as judged aurally by an operator.

Additionally a general speech model HMM was constructed as shown in FIG. 12b which is the same as shown above in part of FIG. 4, ie it does not include whole words but contains only monophones. With this FIG. 12b general speech model the same recorded word used in FIG. 12a was processed to obtain a cost value $C_b$; note this $C_b$ compares an uttered word against a large number of phonemes and noises of varying similarity to the word model in FIG. 12a. For each utterance the difference D between $C_w$ and $C_b$ was computed. Values of D for all of the data used with FIG. 11 were computed and plotted onto FIG. 13 which is a cumulative histogram against $C_w$–$C_b$. This FIG. 13 shows a substantial separation of correctly and incorrectly spoken words. Again the selection of correct and incorrect words in the recordings was made by adult experts.

Values of $C_w$–$C_b$ may be used with the HMM shown in FIG. 4, ie word costs associated with passage through both the word HMM and general speech model are computed. Note at the end of traceback computation, eg as in FIG. 10 there will be accumulated cost associated with both the word model and general speech model, but the lowest cost will indicate which path was the most likely word or general speech model. Additionally a penalty cost generator may be attached to the general speech model; it adds a number to costs through the general speech model. This penalty generator is operator variable to adjust the system's sensitivity to mispronunciation and adds a cost value to the general speech model costs.

Additionally it is found that different words require different penalty values to achieve the same accuracy of correct recognition. Thus a look-up table may be arranged in the dictionary 5 so that as each new acoustic word model is formed, the penalty value is changed as appropriate. This preset penalty is in addition to any value set by a teacher to suit individual children. A high penalty value will increase the probability of a feature vector going through the word model rather than the general speech model, and hence increase the chance of poorly spoken words being indicated as acceptable. A low penalty value will increase the probability of utterances passing through the general speech model and hence increase the indication of poorly spoken words.

Figure 14:
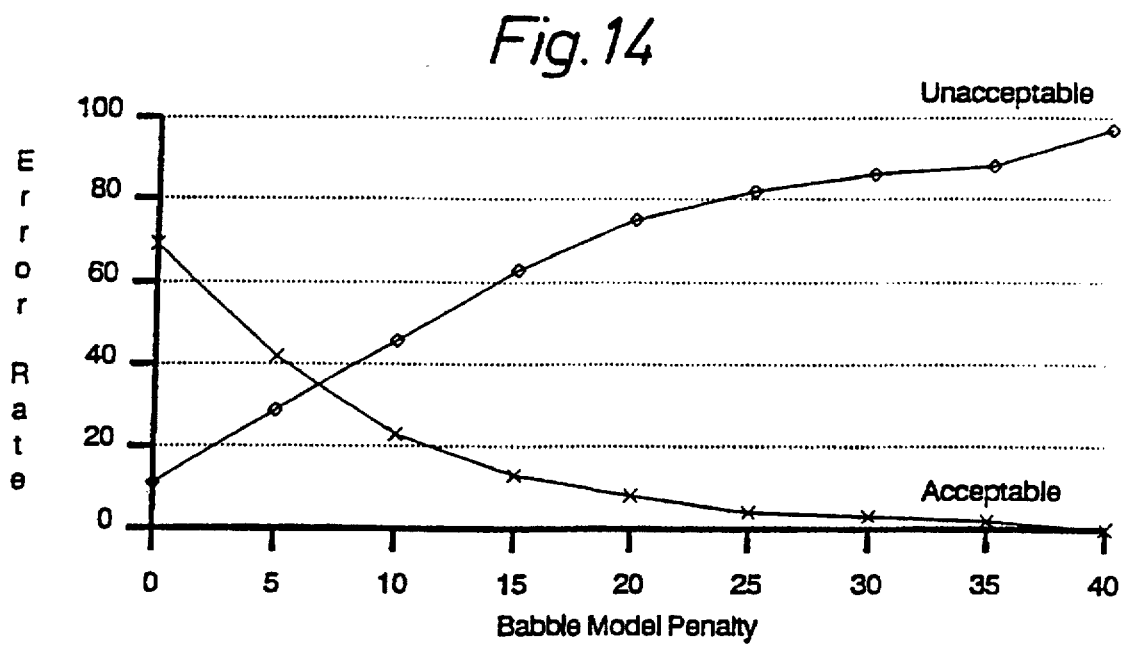
FIG. 14 is a graph of error rate against general speech model penalty values applied to the acoustic model of FIG. 4, FIGS. 15, 16, and 17 are alternative acoustic models to that shown in FIG. 4.

FIG. 14 shows the effect of varying penalty cost values for the system of FIG. 4. In this case children with varying degrees of speech impediment spoke a total of 1000 words. A research team of adult experts was asked to rate the pronunciation of each word as acceptable or unacceptable. As shown for the particular data used, with a penalty of seven the system classified over 70% or the words as acceptable or unacceptable in agreement with the research team.

In summary, a child's utterances are computed as acceptable or unacceptable by comparing the difference between accumulated word costs in passing through an operator-set word model with the accumulated cost in passing through a general speech model plus adjustable penalty costs.

Alternative HMMs may be arranged to take account of initial stammer, or to provide additional checking of correctness of pronunciation within a correctly identified word.

Figure 15:
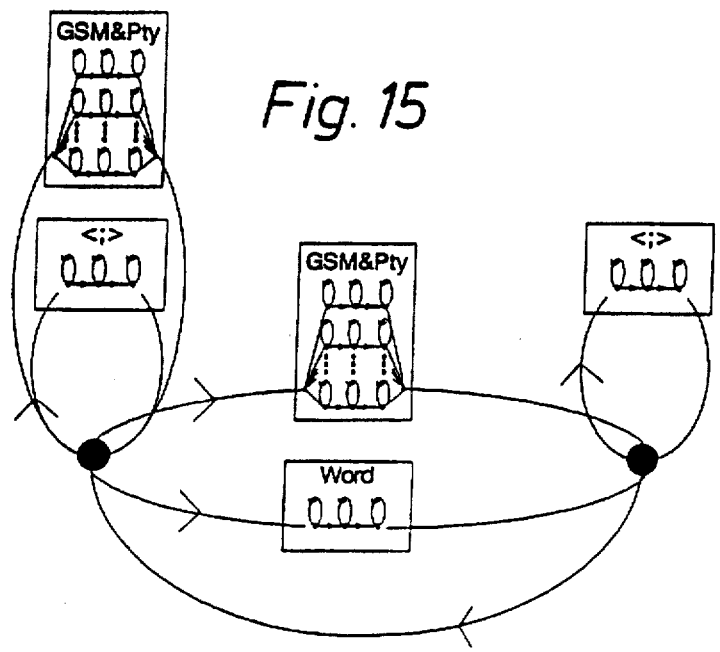

FIG. 15a shows syntax when an amount of stammer is to be expected. This differs from that of FIG. 4 in that an additional general speech model is in parallel with the initial silence HMM. The object of this arrangement is to provide a separation of stammer and requested word utterance.

Figure 16:
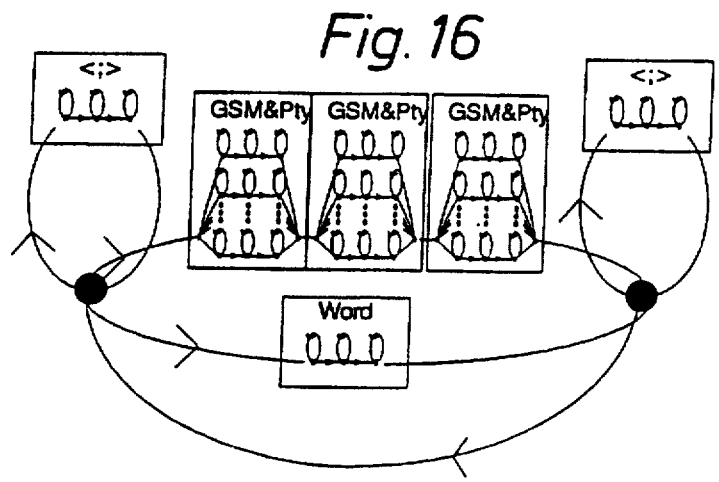
Figure 17:
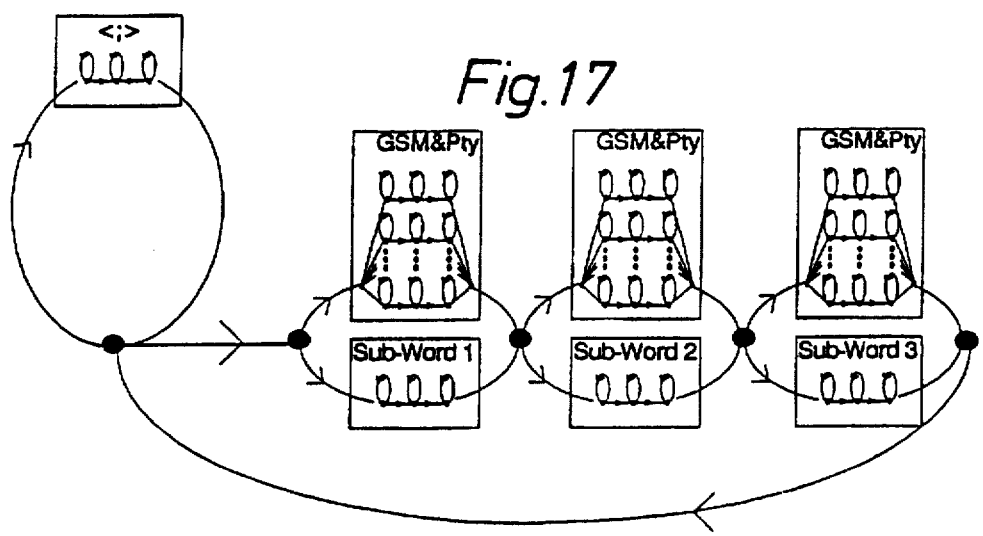

FIG. 16 differs from that of FIG. 4 in having a series of general speech models. The number of general speech models equals the number of phonemes in the word model. FIG. 17 differs from that of FIG. 16 in having separate comparing of individual phoneme/sub-word models with a general speech model. Thus each phoneme/sub-word in the requested word is compared with a general speech model, thereby providing an indication of how correctly each phoneme/sub-word is pronounced. This may be a diagnostic aid in identifying which phonemes/sub-words cause problems to a child.

In use to check a child's speech, an operator may enter a word or words via the keyboard into the computer 1 as prompted by messages on the monitor. This entered word appears on the monitor 10. Next the operator is prompted to enter the required amount of penalty. These two inputs set the training aid to form an acoustic word model for entered word for combining with the stored general speech model as shown in FIG. 4, and the system is then ready for use.

A child wears the headset and microphone and is guided to speak when ready. This guidance may be aurally from the speech synthesizer speaking a simple message such as "repeat after me" and then the set word eg "seven" etc. After the training aid has processed the child's utterance, further messages are given such as "well done", or "please say that again" etc. Alternatively the guidance may be visual, ie messages, on the monitor, with or without instructions to press keys on the keyboard. In another use-mode, an operator may give guidance eg by speaking the set word and inviting the child to copy. The operator might then monitor the output from the training aid giving an indication of correctness of the child's utterance.

At the end of a session, the computer may output a record of the words spoken by the child, together with computed accuracy for each word. This record may then be used later for decisions on further sessions or remedial help.

The acoustic model shown in FIG. 4 comprised only a single word-model, that for "seven" plus a general speech model. Depending upon the computing power, more than one word-model can be set up so that different set words can be recognised. This has the advantage that word order is not important, but each word would need to be spoken with short time separations. Alternatively and preferably, the single word-model in FIG. 4 can be changed to a new word, after the first word has been spoken correctly. Thus the teacher may set up a string of words to be spoken in a selected order. The speech training aid takes about 100 ms to construct a new word-model for use by the speech pattern marcher 4.

We claim:

1. A child's speech training aid comprising;

an acoustic model store for storing acoustic models of context sensitive phonemes representing the processed results of speech by numerous children;

a dictionary for storing a list of words together with information to construct acoustic models of these words from the acoustic model store;

a network generator for generating an acoustic model of a required word together with an acoustic model of general speech sounds;

input means for requesting the generation of an acoustic model of the required word;

means for receiving a child's utterances;

means for processing the child's utterances into a form suitable for comparison with acoustic models of speech;

a speech pattern marcher for comparing the processed child's utterances with the acoustic models of the required word and general speech; and means for indicating whether or not the child's utterances are the required word together with an indication of the accuracy of pronunciation of that required word.

2. The training aid of claim 1 wherein the acoustic models are Hidden Markov Models.

3. The training aid of claim 1 wherein the child's utterances are sampled and processed into an N-plurality of channels to provide an N-dimensional feature vector in successive time slot periods forming a sequence of feature vectors.

4. The training aid of claim 3 wherein the speech pattern matcher computes the relative probabilities of the sequence of feature vectors being the same as either the acoustic word model or the acoustic general speech model.

5. The training aid of claim 1 wherein the speech pattern matcher operates continually and the required word is recognised within continual speech.

6. The training aid of claim 1 wherein the speech pattern matcher computes the accumulated cost difference between the beginning and end of a recognised child-spoken word.

7. The training aid of claim 6 wherein the accumulated cost difference is used to give an indication of the accuracy of a child-spoken word.

8. The training aid of claim 1 and further including a variable penalty control arranged to cooperate with the acoustic model of general speech in forming an adjustable standard for the indication of accuracy of a child spoken word.

9. The training aid of claim 8 wherein the value of penalty is changed in accordance with set values associated with different required words.

10. The training aid of claim 9 wherein the set penalty values may be varied by an operator to suit individual children.

11. The speech training aid of claim 1 wherein the input means includes a keyboard for entering required words into the training aid for each testing session.

12. The speech training aid of claim 1 including means for prompting a child to speak the required word.

13. The speech training aid of claim 12 wherein the means for prompting includes a speech synthesizer and loudspeaker.

14. The speech training aid of claim 12 wherein the means for prompting includes a video monitor with screen for display of messages.

15. The speech training aid of claim 1 including means for recording the results of a session of a child's speech, indicating words requested, words spoken correctly, and how correctly spoken.

16. The speech training aid of claim 1 wherein the acoustic word model is a series of sub-word models and general speech models, and the speech pattern matcher gives an indication of the correctness of utterance of the required word.

17. The speech training aid of claim 1 wherein the acoustic word model includes an additional acoustic model prior to the acoustic word model so that stuttering in a child's utterances may be separately processed.

* * * * *